(12) United States Patent
Bommersbach et al.

(10) Patent No.: US 9,939,719 B2
(45) Date of Patent: *Apr. 10, 2018

(54) LIGHT MODULATOR IMAGE DISPLAY PROJECTOR ARCHITECTURES

(71) Applicant: TEXAS INSTRUMENTS INCORPORATED, Dallas, TX (US)

(72) Inventors: William M. Bommersbach, Richardson, TX (US); Gregory S. Pettitt, Farmersville, TX (US); John M. Ferri, Allen, TX (US); Sajjad Khan, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,925

(22) Filed: May 26, 2017

(65) Prior Publication Data
US 2017/0269465 A1 Sep. 21, 2017

Related U.S. Application Data

(63) Continuation of application No. 14/286,326, filed on May 23, 2014, now Pat. No. 9,664,989.

(60) Provisional application No. 61/826,871, filed on May 23, 2013.

(51) Int. Cl.
*G03B 21/20* (2006.01)
*G03B 33/06* (2006.01)
*G03B 33/12* (2006.01)
*H04N 9/31* (2006.01)

(52) U.S. Cl.
CPC ......... *G03B 21/204* (2013.01); *G03B 21/208* (2013.01); *G03B 33/06* (2013.01); *G03B 33/12* (2013.01); *H04N 9/3158* (2013.01); *H04N 9/3161* (2013.01)

(58) Field of Classification Search
CPC .............................. G03B 21/142; G03B 21/14
USPC .................................................... 353/31, 121
See application file for complete search history.

(56) References Cited

U.S. PATENT DOCUMENTS

| | | | |
|---|---|---|---|
| 5,612,753 A | 3/1997 | Poradish et al. | |
| 5,905,545 A | 5/1999 | Poradish et al. | |
| 9,470,886 B2 | 10/2016 | Bartlett | |
| 9,664,989 B2 * | 5/2017 | Bommerbach | ...... G03B 21/204 |
| 2010/0220298 A1 | 9/2010 | Wang et al. | |

(Continued)

*Primary Examiner* — Steven H Whitesell Gordon
*Assistant Examiner* — Jerry Brooks
(74) *Attorney, Agent, or Firm* — Michael A. Davis, Jr.; Charles A. Brill; Frank D. Cimino (57) ABSTRACT

In described examples, a first TIR or RTIR element is arranged to introduce at least red light to a first spatial light modulator for modulation thereof, and a second TIR or RTIR element is arranged to introduce at least green light to a second spatial light modulator for modulation thereof. At least one of the first and second TIR or RTIR elements is arranged to introduce blue light to at least one of the first and second spatial light modulators, respectively, for modulation thereof: time-sequentially apart from the first spatial light modulator's modulation of the introduced red light, to an extent the blue light is so introduced to the first spatial light modulator; and time-sequentially apart from the second spatial light modulator's modulation of the introduced green light, to an extent the blue light is so introduced to the second spatial light modulator.

18 Claims, 10 Drawing Sheets

(56) References Cited

U.S. PATENT DOCUMENTS

2010/0283921 A1 11/2010 Li
2011/0211333 A1 9/2011 Bartlett
2012/0300178 A1 11/2012 Sugiyama et al.
2013/0002972 A1 1/2013 Tanaka
2013/0242534 A1 9/2013 Pettitt et al.
2013/0308293 A1 11/2013 Tu et al.

* cited by examiner

LIGHT MODULATOR IMAGE DISPLAY PROJECTOR ARCHITECTURES

CROSS-REFERENCE TO RELATED APPLICATIONS

This application is a continuation of U.S. patent application Ser. No. 14/286,326 filed May 23, 2014, which claims the benefit of U.S. Provisional Patent Application Ser. No. 61/826,871 filed May 23, 2013, the entireties of both of which are hereby incorporated by reference.

BACKGROUND

This relates to image display projector apparatus and methods, especially image display projection employing solid state illumination (SSI) light sources generating different color components utilizing laser light sources and phosphor emissions.

Current solid state illuminated projectors producing more than about 1000 lumens utilize blue laser diodes and a spinning phosphor wheel. The illumination typically involves sequential generation of blue, green and red color light, and the sequentially different colored light is directed to a pixel light modulator of one type or other. The pixel light modulator may, for example, be a spatial light modulator (SLM) such as a Texas Instruments DLP® digital micromirror device (DMD) whose mirrors are individually set using pulse-width modulation (PWM) intensity grayscaling with settings synchronized to respective time segments for illumination of the mirrors by the respective sequentially generated colors.

In a typical solid state illumination (SSI) system, at least red, green and blue color illumination time segments are generated. Other color time segments (viz., yellow or other secondary color, white, and/or black periods) are also possible. In a usual arrangement, a green color light is generated indirectly by illuminating a green color-emitting segment of the spinning phosphor wheel with light from a typically blue laser light emitting diode (LED), while red color light is generated either indirectly by illuminating a red color-emitting phosphor segment of the same wheel with the blue laser light or directly by using a separate red light LED. The blue color light is usually generated directly using the blue laser light itself. A diffuser may be used to reduce speckle from the coherent light.

An example solid state projector using blue laser LEDs and a phosphor color wheel as an illumination system and a spatial light modulator for modulation of the generated illumination is described in U.S. patent application Ser. No. 13/652,129 filed Oct. 15, 2012, entitled "Projector Light Source and System, Including Configuration for Display of 3D Images," the entirety of which is incorporated herein by reference. Such system utilizes blue lasers as a direct source of blue color light and utilizes the blue lasers as an indirect source of other color light by energizing other color light producing phosphors with the blue color light from the blue lasers. The overall layout for such a system is illustrated in FIG. 1 of U.S. Provisional Patent Application Ser. No. 61/756,407 filed Jan. 24, 2013, entitled "Split Phosphor/Slit Color Wheel Segment for Color Generation in Solid-State Illumination System," the entirety of which is incorporated herein by reference. Because the illumination system generates one output color directly from the input source light and one or more other output colors indirectly by secondary emission, projectors utilizing such illumination systems are often referred to as hybrid SSI laser projectors.

A typical phosphor color wheel as used in the described solid state projector has annular arcuate region segments (viz., sectors of an annulus defined by two radii separated by an inner angle and by the inner and outer arcs they intercept) coated with different color emitting phosphors disposed at respective angularly spaced positions in a ring, circumferentially about a circular wheel. An example phosphor color wheel of this type is shown in FIG. 2 of U.S. Provisional Patent Application Ser. No. 61/756,407. For image display, the color wheel is rotated to move the phosphor coated ring through a given angular rotation (e.g., ½, 1 or 2 revolutions) during an image frame display time (eye integration time). The laser light input beam is directed onto the wheel annulus to illuminate an area (viz., spot) through which the different segments pass sequentially as the wheel rotates. The wheel is typically rotated at a constant rotational speed, with the angular extent of the respective different color generating segments determined, at least in part, by the relative brightnesses of the generated illumination.

In the example wheel shown in FIG. 2 of U.S. Provisional Patent Application Ser. No. 61/756,407, the wheel is a circular wheel having a reflective aluminum front surface (surface facing the input beam) and different color generating annular sectors angularly spaced circumferentially about a marginal band. The wheel is mounted centrally for rotation about a shaft at an adjustably settable, constant rotational speed (viz., one revolution per image frame display time). The illustrated wheel has two instances of angularly-spaced blue, green, red and yellow color generating segments which are sequentially driven past the incident input beam. Although not required, the illustrated sequence is the same in each instance. The blue segment comprises a slit for generating blue color by passing the input beam through the slit and around a wraparound path (see FIG. 1) back to the projection optics. The green, red and yellow segments comprise respective annular regions coated with different color light-emitting phosphors for respectively emitting corresponding green, red and yellow color light when energized by the incident input beam.

When rotated at constant rotational speed, the arcuate (angular) extent of each segment determines the amount of time that the color generated by that segment will be available for modulation to produce the corresponding color intensity contribution for the various pixels of the displayed image. The relative arcuate extents are thus established, at least in part, based upon the relative maximum intensities of the segment generated colors. Thus, the blue segment (which generates the brightest color because it passes the input blue laser light directly for generation of the blue color generation) has the shortest angular extent, and green (which is the weakest intensity generated by incident laser light energization of the color producing phosphors) has the longest. The illustrative layout shown in FIG. 2 of U.S. Provisional Patent Application Ser. No. 61/756,407, for example, provides blue, green, red and yellow color sequences using 2×28° blue laser light transmitting slit segments, 2×61° green light emitting phosphor segments, 2×51° red light emitting phosphor segments, and 2×40° yellow light emitting phosphor segments.

In such arrangement, phosphors determine the red and green color points, and laser light passing through the opening and the laser input beam wavelength determine the blue color point. For the wheel shown in FIG. 2 of U.S. Provisional Patent Application Ser. No. 61/756,407, the opening defining the slit takes the form of a window with an arcuate metal strip left at the wheel circumference, radially outwardly bordering the window. This strip leaves the circular wheel with an unbroken outer edge that improves rotational stability and reduces audible noise generation. The laser beam (spot) is directed to completely pass through the window opening. To reduce speckle and otherwise smooth the directly utilized blue laser light, a diffuser may be added in the blue light source or reuse path.

Other arrangements for generating color sequences during relative movement of a color wheel and input light beam are also possible. An example color wheel having concentric annular tracks or rings of the respective different color emitting phosphors located at different radially spaced locations is described in U.S. Patent Application Publication No. 2011/0211333 A1,published Sep. 1, 2011, entitled "Wavelength Conversion," the entirety of which is incorporated herein by reference.

An example of a blue laser light source used in SSI systems is a blue laser diode, such as commercially available from Nichia, that emits light in the 445-448 nm wavelength spectral region. Such laser diodes are relatively inexpensive and efficient. However, the dominant wavelengths of such less expensive laser diodes are shorter than typically used in non-SSI illumination system, so may result in a less aesthetically pleasing purplish blue color contribution in the displayed image.

Several approaches have been suggested to modify the blue color emitted using light from the blue lasers as a direct source for blue color generation. The use of cyan phosphor in combination with blue laser light in a system using a blue light wraparound path is described in U.S. Provisional Patent Application Ser. No. 61/752,294 filed Jan. 14, 2013, entitled "Method of Utilizing a Cyan Phosphor to Color Correct a Laser Illuminated Projection System," the entirety of which is incorporated herein by reference. The use of cyan phosphor in combination with blue laser light in a system using a blue light reflection path is described in U.S. Provisional Patent Application Ser. No. 61/753,367 filed Jan. 16, 2013, entitled "Method of Utilizing a Cyan Phosphor to Color Correct a Laser Illuminated Projection System," the entirety of which is incorporated herein by reference. Other approaches for combining phosphor emitted cyan light with blue laser light for blue color generation are described in U.S. Provisional Patent Application Ser. No. 61/757,810 filed Jan. 29, 2013, the entirety of which is also incorporated herein by reference.

SUMMARY

In described examples, a first TIR or RTIR element is arranged to introduce at least red light to a first spatial light modulator for modulation thereof, and a second TIR or RTIR element is arranged to introduce at least green light to a second spatial light modulator for modulation thereof. At least one of the first and second TIR or RTIR elements is arranged to introduce blue light to at least one of the first and second spatial light modulators, respectively, for modulation thereof: time-sequentially apart from the first spatial light modulator's modulation of the introduced red light, to an extent the blue light is so introduced to the first spatial light modulator; and time-sequentially apart from the second spatial light modulator's modulation of the introduced green light, to an extent the blue light is so introduced to the second spatial light modulator.

BRIEF DESCRIPTION OF THE DRAWINGS

FIGS. 3 through 13 illustrate SSI light sources embodied in architectures employing two SLMs of the DMD type.

DETAILED DESCRIPTION OF EXAMPLE EMBODIMENTS

FIGS. 1 through 13 illustrate example embodiments of solid state illumination (SSI) in architectures employing multiple spatial light modulators (SLMs) of the digital micromirror device (DMD) type.

Several DMD SLM imaging system designs have been developed that use LED and laser/phosphor light source illumination. The laser/phosphor light source provides certain efficiency advantages over traditional light source based systems. The laser spot size can also be decreased in order to best match the etendue of the DMD in the system. However, in laser/phosphor based systems, it may be necessary to filter the phosphor emitted colors in order to achieve desired color points. An example of such filtering is the use of a yellow color emitting phosphor and filtering the phosphor emitted yellow to achieve a desired red color. Another example is the use of filtering to filter a green color phosphor emission in order to achieve a desired green color point. Each of these examples filters the full spectrum of light generated by the phosphor to remove a part of the spectrum not needed.

In order to achieve higher brightness, more lasers are used in the system. The more lasers which illuminate the phosphor, the more light is generated by the phosphor. The additional lasers result in higher lumens, but at the cost of additional power. They also cause the phosphor to reduce in light generating efficiency (efficacy: lumens per input watt), and the added number of lasers increases the cost of the system. Multi-chip system architectures may reduce or eliminate some issues encountered with using laser/phosphor based light sources in a single chip architecture.

A novel architecture that utilizes three DMD chips in an image display system is described in U.S. Provisional Patent Application Ser. No. 61/824,726 filed May 17, 2013,entitled "Color Display Projection Method and Apparatus," the entirety of which is incorporated herein by reference. In that system, light from a white illumination source is separated into constituent red, green and blue (RGB) color components in a lower portion of a color separation/recombination X-cube cross dichroic prism structure (see, e.g., U.S. Pat. No. 6,363,186, incorporated herein) and delivered via associated respective total internal reflection (TIR) or reverse total internal reflection (RTIF) prisms to separate DMDs for spatial modulation of the individual color components. Following modulation by the separate DMD chips, the separately modulated components are recombined in an upper portion of the same X-cube prism structure and transmitted toward projection optics for imaging of a resultant image onto an imaging surface. Compactness in the optical system surrounding the X-cube may be achieved through utilization of novel tilt and roll DMD micromirror pixels which enable arrays to be illuminated from either sides or bottoms of the array. Such DMD pixels are described in U.S. Provisional Patent Application Ser. No. 61/823,304 filed May 14, 2013, entitled "Micromirror Apparatus and Methods," the entirety of which is incorporated herein by reference.

Figure 1:
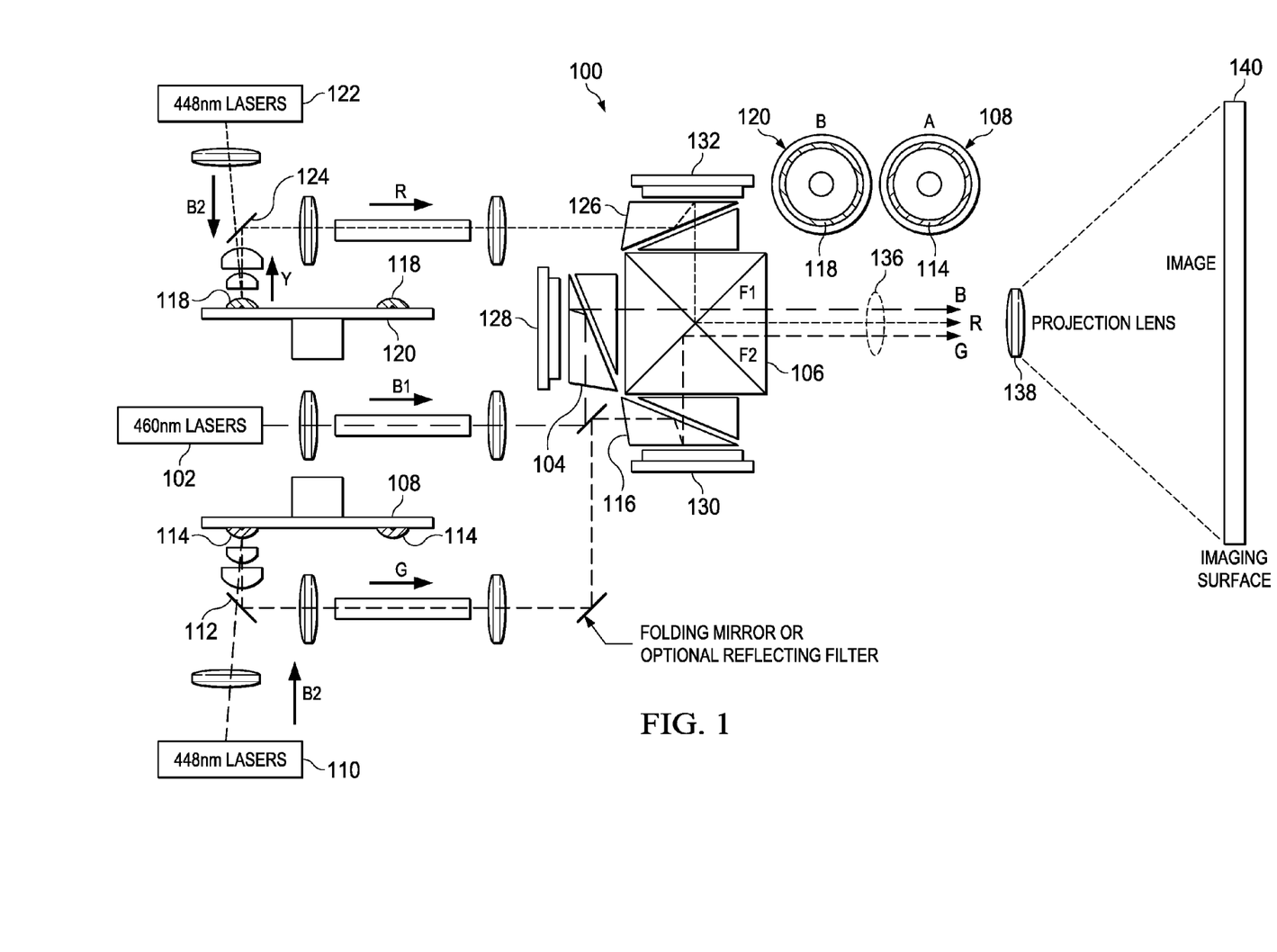
FIGS. 1 and 2 illustrate a solid state illumination (SSI) sources embodied in architectures employing three spatial light modulators (SLMs) of the digital micromirror device (DMD) type.

FIG. 1 illustrates an SSI architecture 100 in an X-cube arrangement that utilizes three DMD chips in association with respective TIR or RTIR optical elements of the type described in U.S. Provisional Patent Application Ser. No. 61/823,304. However, in contrast to the white light source arrangement described in U.S. Provisional Patent Application Ser. No. 61/823,304, red, green and blue (RGB) components are generated using blue laser light and phosphor emissions, not by white light color separation by the X-cube prism structure. Thus, the length of the color cube may be shortened because only the upper portion color recombination purpose is utilized. The input SSI system RGB components are input directly to the TIR (or RTIR) elements.

In the example arrangement 100 of FIG. 1, blue light B1 from a 460 nm wavelength laser light source 102 is shown introduced directly to the TIR element 104 of the blue channel at one side of the cube 106. The green light for the green channel is shown generated by emission of green light G from green light emitting phosphor coated segments 114 of a first phosphor wheel 108. The phosphor wheel 108 is exposed to source blue light B2 from a 448 nm wavelength laser 110 which is transmitted through a filter 112. Light striking the first wheel 108 energizes the phosphor 114 which emits green light G back along the incident path where it is reflected by the same filter 112 and directed to the TIR element 116 of the green channel at a second side of the cube 106. The phosphor emitted green light G may be subjected to further filtering (pre-filtered) along its path, to "tune" the green wavelength (pass desired components and block undesired components) prior to entering the TIR element 116. The red light R for the red channel is shown generated by emission of yellow light Y from yellow light emitting phosphor coated segments 118 of a second phosphor wheel 120. The second wheel 120 is exposed to source blue light B2 from another 448 nm wavelength laser 122 which is transmitted through a filter 124 that passes the blue laser light B2 in transmission and passes one or more red components of the phosphor emitted yellow light Y in reflection. Light striking the second wheel 120 energizes the phosphor 118 which emits yellow light Y back along the incident path where the red component R is reflected by the blue transmitting filter 124 and directed to the TIR element 126 of the red channel at a third side of the cube 106. The red light R reflected by the blue transmitting filter 124 may also be subjected to further filtering to "tune" the red wavelength. Each separately introduced RGB color is then separately modulated by the DMD chip 128, 130, 132 associated with its respective color channel and then passed via the associated TIR element 104, 116, 126 into the X-cube 106 which functions to combine the colors into a combined modulated RGB image forming light stream 136 for image formation via projection optics138 onto a target imagining surface 140.

FIG. 1 (at A and B) illustrates example configurations for the first and second phosphor wheels 108, 120. The illustrated configurations contemplate that green and yellow emissions will occur during the entire rotary travel of the wheels 108, 120 (360° band of phosphor). In such case, duration of the yellow and green emissions to the projection lens 138 may be continuous, or may be varied under control of pulsing (e.g., "ON"/"OFF" settings) of the laser 110 or 122. The intensities of the contributions of red, green and blue (RGB) components at the respective pixel positions in the projected image may be controlled by settings ("ON"/ "OFF" states) of the DMD mirror modulator elements and/or by control of the intensities of the source light from the respective lasers. It will be appreciated that other embodiments of phosphor wheel segmenting may be utilized, and also that red, blue and green (RGB) component light generation for input to the TIRs (or RTIRs) 104, 116, 126 may be generated using other combinations or colors for laser light and phosphor emissions (see, for example, variations disclosed in the patent applications incorporated herein). Likewise, it will be appreciated that a stationary phosphor target may by used in lieu of wheels, with the continuous ring phosphor segments 114, 118 shown at A and B replaced, for example, with a stationary phosphor target. Concentric rings with different segment configurations at different radial positions on a radially displaceable wheel or other dynamically shiftable different segment configurations may also be utilized.

Figure 2:
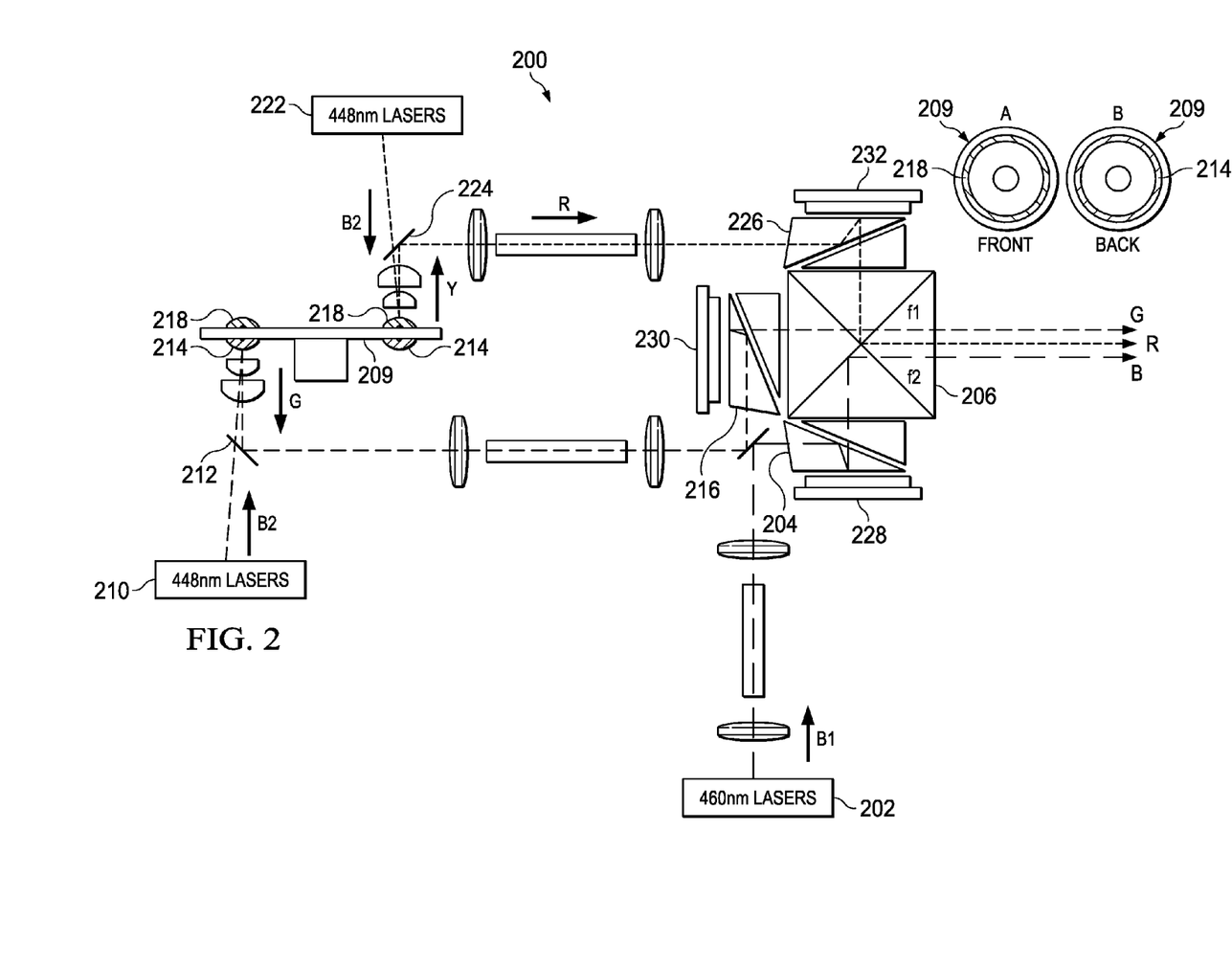

FIG. 2 illustrates a modified three DMD chip implementation 200 that uses an X-cube 206 in association with respective separate R, G, B color channel DMDs 228, 230, 232 and TIR or RTIR optical elements 204, 216, 226 of the type described in U.S. Provisional Patent Application Ser. No. 61/823,304. As with the FIG. 1 arrangement 100, blue light B1 from a blue laser light source 202 (460 nm) is passed directly to a TIR prism 204 and DMD 228 on one side of the X-cube 206; and green and yellow light G, Y emitted from color wheel phosphor segments 214, 218 through excitation by light from other blue laser light sources (448 nm) 210, 222 is passed through transmissive/ reflective elements (filtered) 212, 224 to generate green and red light G, R which is passed to respective TIR prisms 216, 226 and DMDs 230, 232 on other sides of the X-cube 206. In contrast to the arrangement shown in FIG. 1, however, the green and yellow color emitting phosphors 214, 218 are located on opposite sides of a single color wheel 209 (see, front and back views at A and B in FIG. 2).

An example of a prior full-color projection display system using two DMD light modulators is described in U.S. Pat. No. 5,612,753, incorporated herein by reference. A two modulator projector described with reference to FIG. 3 in U.S. Pat. No. 5,612,753 uses an illumination source in which white light (e.g., from a metal halide arc lamp) passes through different color filter segments of a rotating color wheel. The respective sequential different color light emitted by the color wheel is relayed through a color splitting prism that passes a dominant first color to a first DMD modulator and other second colors to a second DMD modulator. The color splitting prism cooperates with a TIR prism to recombine the reflected separate DMD modulated different color light for imaging by a single projection lens. In the described system, the color wheel always passes one of the primary colors, and alternates between the other two. For example, if the wheel always passes red (R) and alternates between green (G) and blue (B), the wheel would be made of yellow and magenta segments (since red and green combine for yellow and red and blue combine for magenta). The first DMD would then handle modulation of the red (dominant color) and the second DMD would handle time sequential modulation of green and blue (the other colors). With the described arrangement, the dominant color (viz., R) is three times brighter than in a comparable single modulator system because separate modulation of that color enables its projection for the complete frame rather than for only one-third of the frame if modulated with a shared modulator. The other two colors (viz., G and B) will be 50% (i.e., one and one-half times) brighter since they will be projected for one-half the frame rather than one-third of the frame as now only two colors share their modulator instead of three. The selection of red as the dominant color is not a requirement; however, the color chosen for modulation by the unshared (first) DMD will normally be the color which needs the greatest amount of boost. The attenuation applied to the dominant color path can be controlled as needed to boost the red output relative to the green and blue to obtain the proper color balance point. Where the white light source is uniformly color balanced, attenuation of the dominant (red) color path by 50% will produce a uniform color balance with a total projected lumen output 50% higher than the comparable single modulator system.

FIGS. 3 through 13 illustrate SSI illumination sources embodied in architectures employing two DMD chips wherein laser light sources and phosphor emissions are used instead of a white light source, with a two-prism cube used for combining the separately modulated colors.

Figure 3:
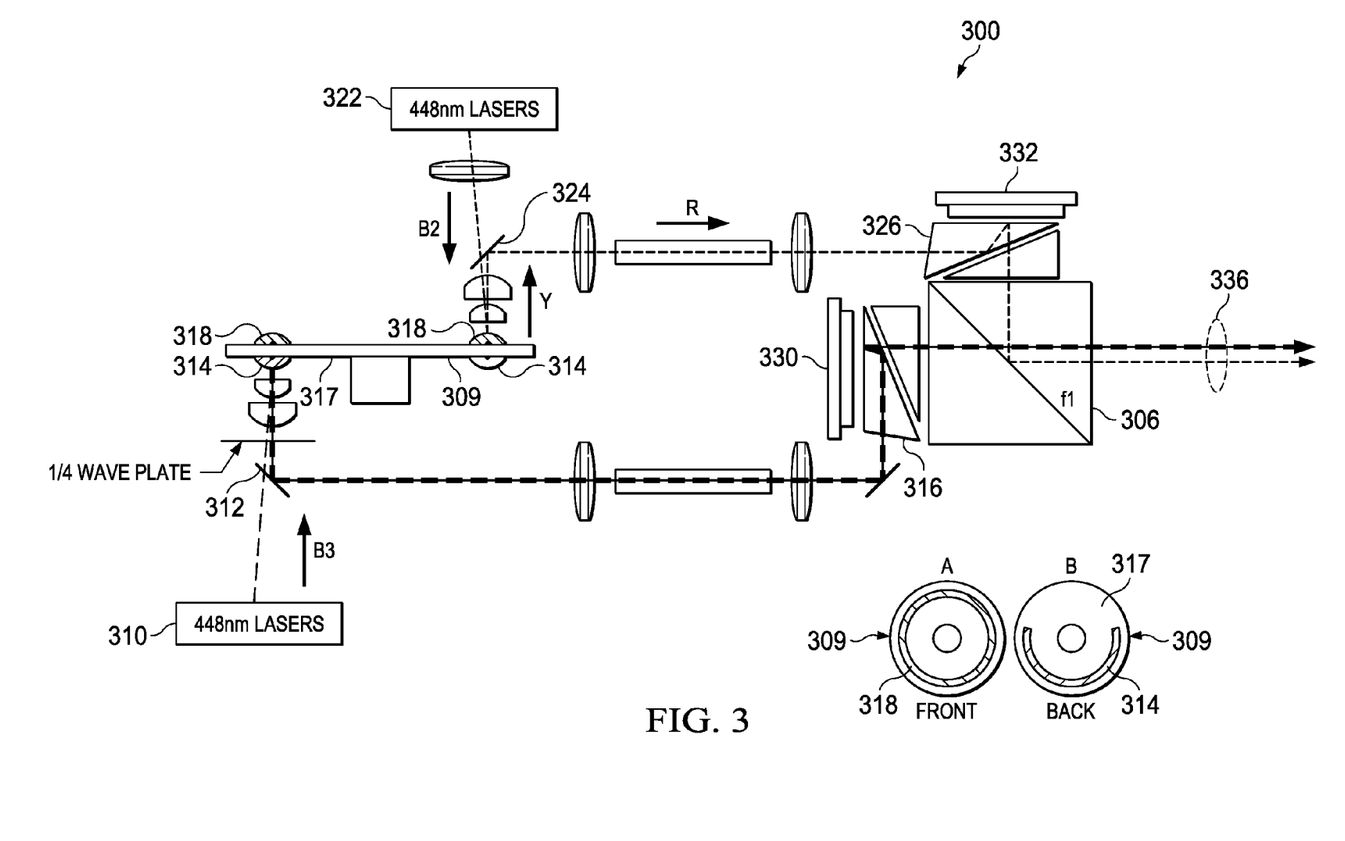

In the embodiment 300 shown in FIG. 3, blue laser light B2 from a first 448 nm wavelength light source 322 is transmitted through a first angled filter 324 onto the front of a phosphor wheel 309 which has a circular segment coated with a yellow emitting phosphor 318 (see view A in FIG. 3). The yellow segment is continuous, so is exposed to the incident laser light for the full rotation of the wheel 309 which is rotated by at least one revolution per frame time. The yellow light Y is emitted back to the first angled filter 324 which reflects at least the red component R as the dominant color via a first TIR optical element 326 to the first DMD 332 for separate modulation. Blue laser light B2 from a second 448 nm wavelength laser light source 310 is transmitted through a second angled filter 312 and a one-quarter wave plate (QWP) 315 onto the back side of the phosphor wheel 309. The back side of the wheel 309 has a slightly more than 180° segment coated with a green light emitting phosphor 314 (see view B in FIG. 3) which emits green light G in response to the blue incident laser light B2 for slightly more than 50% of the frame time, and reflects the blue incident light B2 off a specular (e.g., aluminum) back surface 317 for the remainder of the frame time. The sequentially emitted green and blue colors travel back through the one-quarter wave plate 315 and to the angled filter 312 which reflects the phase-shifted blue and green via a second TIR optical element 316 to the second DMD 330 for common time sequential modulation. The modulated dominant (R) and other color (G and B2) light is then combined by the two prism cube 306 into a modulated composite beam 336 for projection of a formed image onto a target surface. The relative arcuate extent of the green phosphor segment 314 and the laser "ON"/"OFF" times may be chosen to vary the respective color modulation times to set a desired color (white) point.

Figure 4:
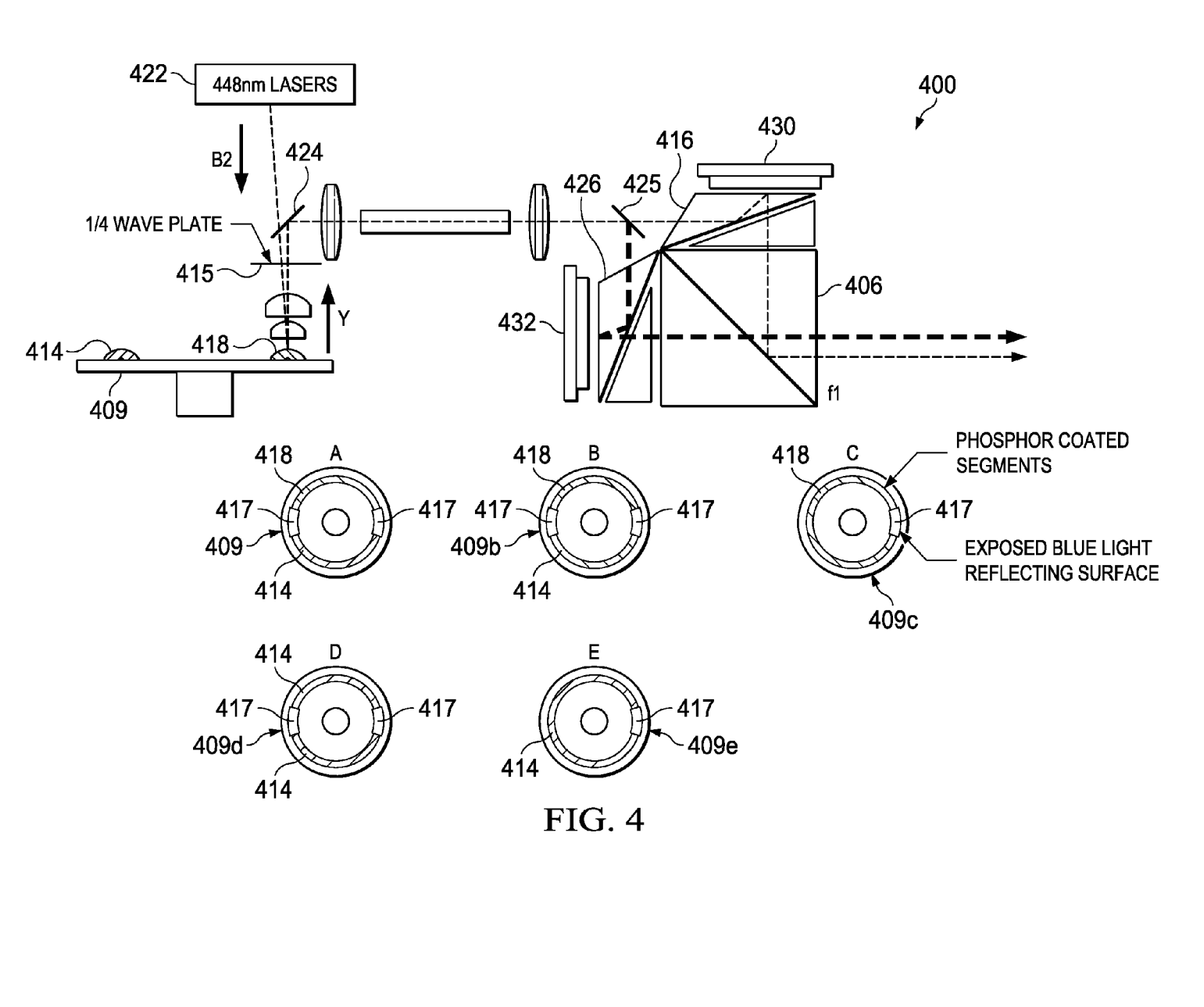

FIG. 4 illustrates a two-chip arrangement 400 utilizing a single 448 nm wavelength laser light source 422 and a single color wheel 409 having a circular arrangement of different length arcuate segments of yellow emitting phosphor 418, green emitting phosphor 414 and blue reflecting surface 417 (view A in FIG. 4). Here, because red and green combine for yellow, green is emitted for the time that the blue laser light B2 is incident on either the yellow or green emitting phosphor segments, and red is emitted for the time that the laser light is incident on the yellow phosphor segment. The blue laser light B2 is directed onto the phosphor wheel 409 by transmission through a first angled filter 424 and passage through a one-quarter wave plate 415. Red/green or green color emitted by excitation of the corresponding yellow or green phosphor 414, 418 segment is directed back through the one-quarter wave plate 415 and reflected off the first angled filter 424. The red is the transmitted through a second filter 425 to a first TIR 416 and first DMD 430 for individual modulation, and the green is reflected by the second filter 425 to a second TIR 426 and second DMD 432. Phase-shifted blue light reflected off the reflecting segments 417 of the wheel 409 is reflected by the first and second filters 424, 425 to the second TIR 426 for time sequential modulation with the green by the second DMD 432. The time sequentially modulated colors are then combined by the two-prism cube 406 for projection of the image for eye integration of the continuous red and time-sequential green/blue modulations during the frame display time at the display screen.

Views B through E in FIG. 4 illustrate some of the many other segment configurations 409b-e that may be used for the phosphor wheel 409 in the arrangement of FIG. 4. Views B and C show wheels 409b, 409c which have yellow light emitting phosphor 418 arranged in a circular ring band on a reflective surface of the wheel. The yellow phosphor 418 segment in View B occupies the positions of both the yellow and green phosphor 418, 414 segments in View A, and has a continuous ring shape interrupted by two approx. 30° arcuate extents of blue laser light reflecting material 417 at diametrically opposite places on the ring. View C is similar, except that the yellow phosphor ring is interrupted by only one blue light reflection portion 417. Neither of the View B or C configurations has a green segment. The phosphor composition of the yellow segments may, for example, provide an emission spectrum like that shown in FIG. 5A, wherein both red and green light are emitted when energized by the incident blue laser light. The dichroic filter elements 424, 425 are suitably chosen to filter the emitted light for directing the desired red and green components R, G to the respective separate first and second DMDs 430, 432 for modulation.

Views D and E of FIG. 4 show wheels 409d, 409e which have green light emitting phosphor 414 segments arranged in circular ring bands like those shown for the yellow phosphor 418 segments in Views B and C. As before, the green phosphor segment rings are similarly interrupted by one or more arcuate intervals of blue light reflecting surface material 417. The View D and E wheels do not have a yellow phosphor segment. The phosphor composition of the green segments is chosen to provide both red and green emissions, such as shown by the example emission spectrum illustrated in FIG. 5B. As before, the emitted light may be filtered by the dichroic filter elements to isolate and direct the desired red and green components R, G for modulation by the respective separate first and second DMDs 430, 432. The different heights of the responses for the yellow and green phosphors 418, 414 indicated by the spectra shown in FIGS. 5A, 5B may be balanced by applying different attenuations at the respective first and second DMDs 430, 432.

Figure 5A:
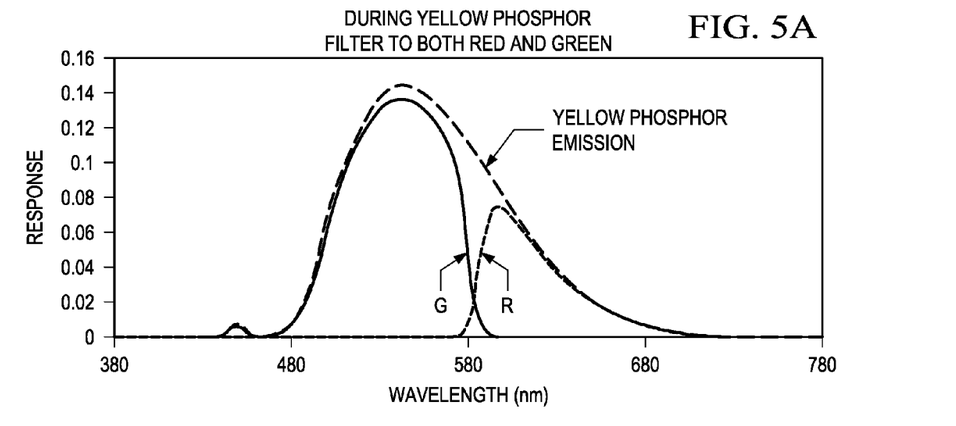
Figure 5B:
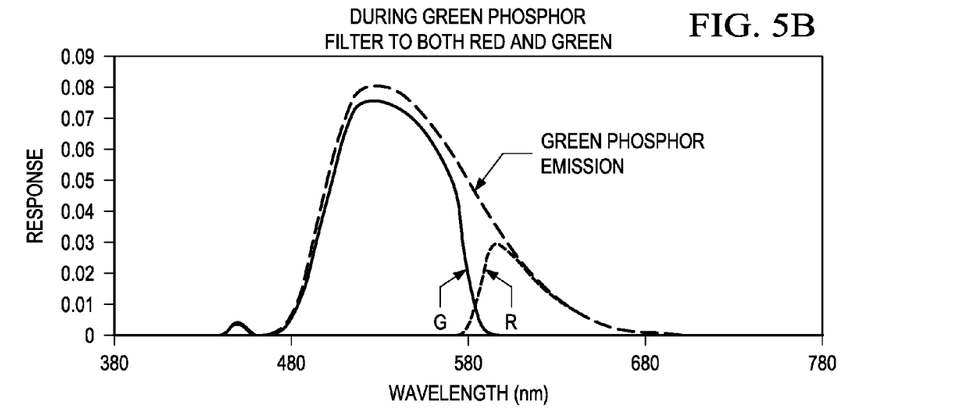
Figure 6:
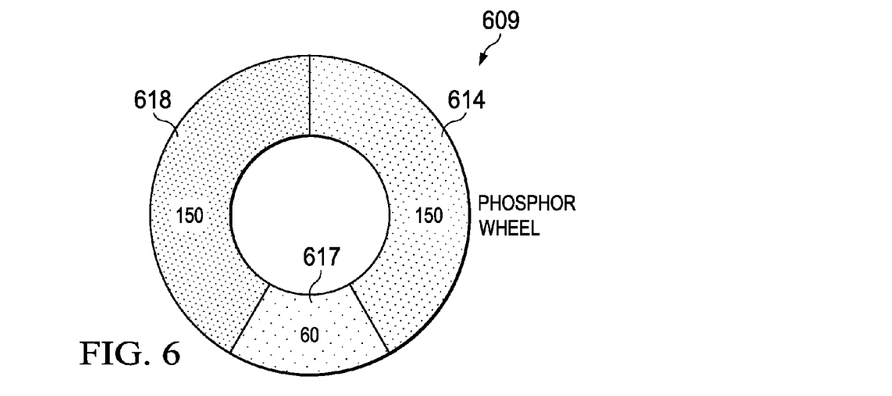

FIG. 6 illustrates a wheel configuration 609 wherein coatings of yellow emitting phosphors 618 and green emitting phosphors 614 having emission spectra like those shown in FIGS. 5A, 5B are applied to a light (viz., blue light) reflecting surface of an aluminum wheel. The yellow and green phosphor coatings 618, 614 define segments each representing a 150° portion of a circular band, and an uncoated region 617 representing the remaining 60° portion of the same band is left uncovered with the light reflecting surface exposed. The wheel 609 may be rotated an integer 1 or greater number of rotations per available frame imaging time.

Figure 7:
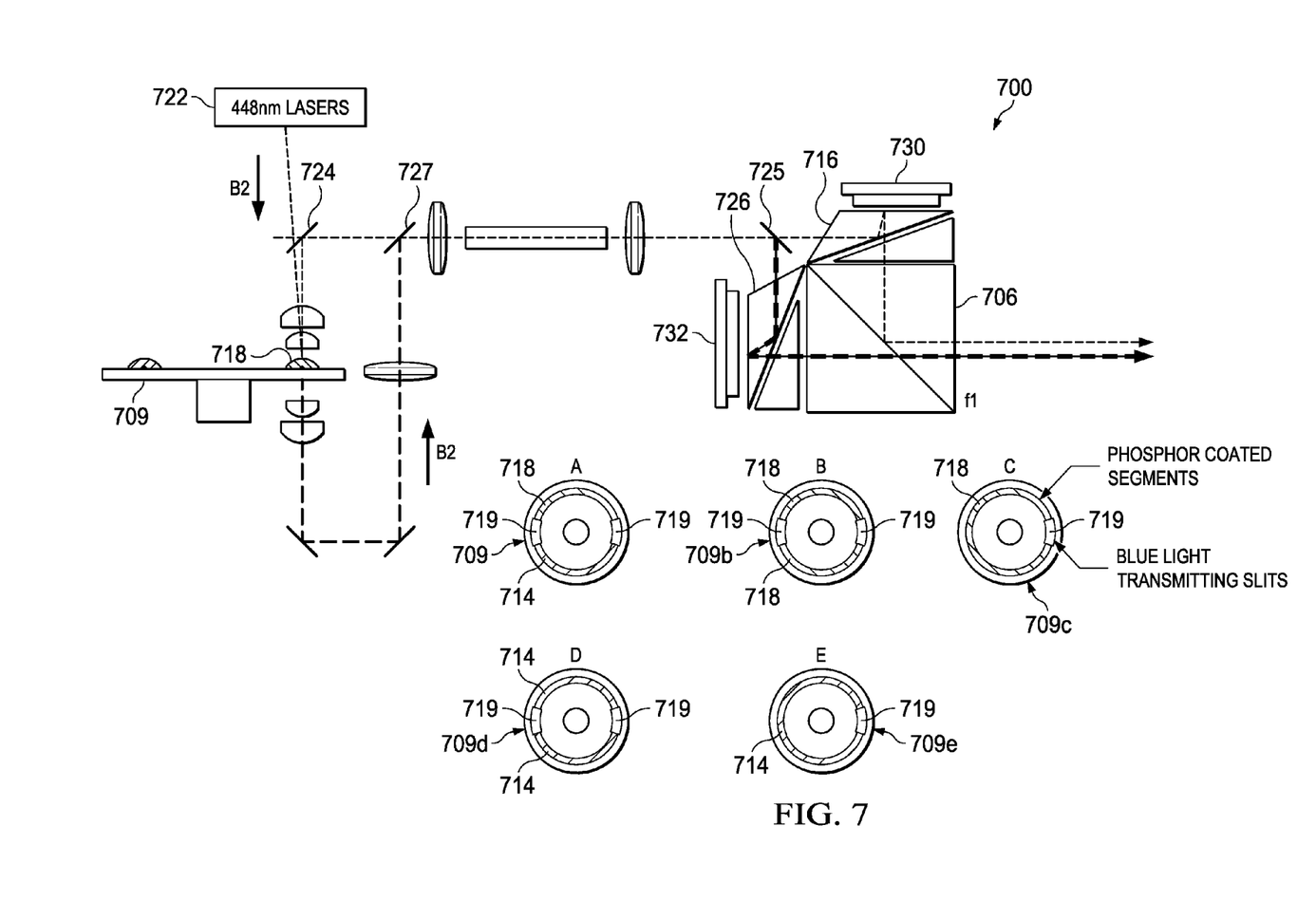

FIG. 7 illustrates a variation 700 of the two-DMD chip arrangement 400 of FIG. 4, wherein the phosphor wheel 709 has blue light transmitting slits 719 in place of all or parts of the blue light reflecting areas 417 interrupting the phosphor ring segments (View A in FIG. 7). Here the red and green light phosphor emissions R, G may be the same as described for the prior arrangement. However, at least a part of the blue laser light B2 is transmitted through the wheel 709 and directed along a separate path to the second DMD 732. For the illustrated embodiment 700, at least a portion of the blue laser light B2 emitted by the 448 nm laser light source 722 is passed through a light transmitting portion 719 of the phosphor wheel 709 as the wheel rotates. The light transmitting portion 719 may, for example, be one or more arcuate slits or blue light transmitting windows added in the position or positions of the blue light reflecting portions 417 described hereinabove in connection with the embodiment of FIG. 4. Example transmitting portions of phosphor wheels are described in U.S. Provisional Patent Application Ser. Nos. 61/752,294, 61/756,407 and 61/757,810. When light from the laser source 722 is incident on a light transmitting portion 719 of the rotating wheel 709, at least a part of that light will pass through the wheel and be directed (e.g., by reflecting optics) along a separate path (which may include an additional filter 727 and some common elements with the red and or green emitted light relaying paths) to the second DMD 732, for timing sequential modulation with the green color light. Optionally, the transmitting portions 719 may be integrated with phosphor segment portions so that, for instance, green and blue light may be modulated together for at least portions of the frame modulation cycles. Views B through E in FIG. 7 illustrate some of the other configurations 709b-e usable for the phosphor wheel 709, with phosphor 714, 718 segments corresponding to the phosphor 414, 418 segment configurations shown in Views B through E in FIG. 4; however, with blue light transmitting slits 719 located at positions previously indicated as positions for blue light reflecting surface material 417. Optical diffusion elements may be provided in coordination with the slits to diffuse the transmitted blue light.

Figure 8:
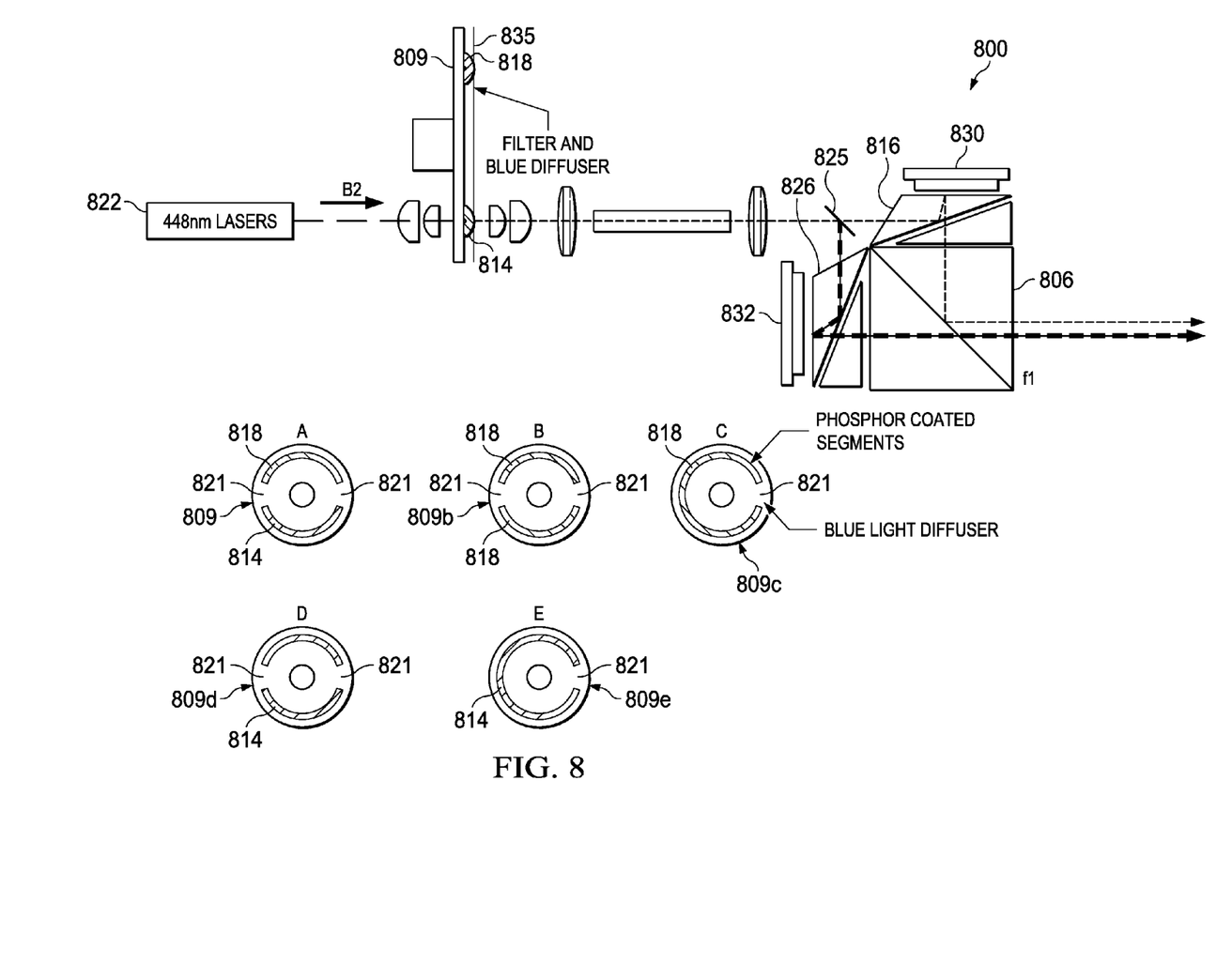

FIG. 8 illustrates another variation 800 of the two-chip arrangement, wherein a transmissive phosphor wheel 809 is used for the generation of all colors. In this setup, the wheel 809 may be made of a light transmissive material either entirely or at least for a part of the wheel that will be used for the light generation. The phosphor material is then coated over one surface of the wheel 809 and excited by laser light directed at an opposite surface of the wheel. For example, the wheel 809 may include a light transmissive band having a first angular extent covered by yellow light producing phosphors 818, a second angular extent covered by green light producing phosphors 814, and one or more third angular extents 821 left uncovered to provide for blue laser light transmission (View A in FIG. 8). As the wheel 809 turns, blue laser light B2 directed at the uncovered surface (back surface) from a 448 nm laser light source 822 will pass through the wheel 809 and either strike phosphor in one of the yellow phosphor 818 or green phosphor 814 coated segments, or pass an uncoated segment 821. For spectra as illustrated in FIGS. 5A and 5B, light striking the yellow or green phosphor will emit red and green light. The phosphor emitted red light will be directed via relay optics including filter 825 to the first TIR 816 and DMD 830 for single color modulation, and the phosphor emitted green light and source directly transmitted blue light will be directed via relay optics including filter 825 to the second TIR 826 and DMD 832 for time sequenced modulation. The wheel 809 may accommodate both filter and diffuser elements 835. Example other wheel configurations 809b-e are shown in Views B through E of FIG. 8.

Figure 9:
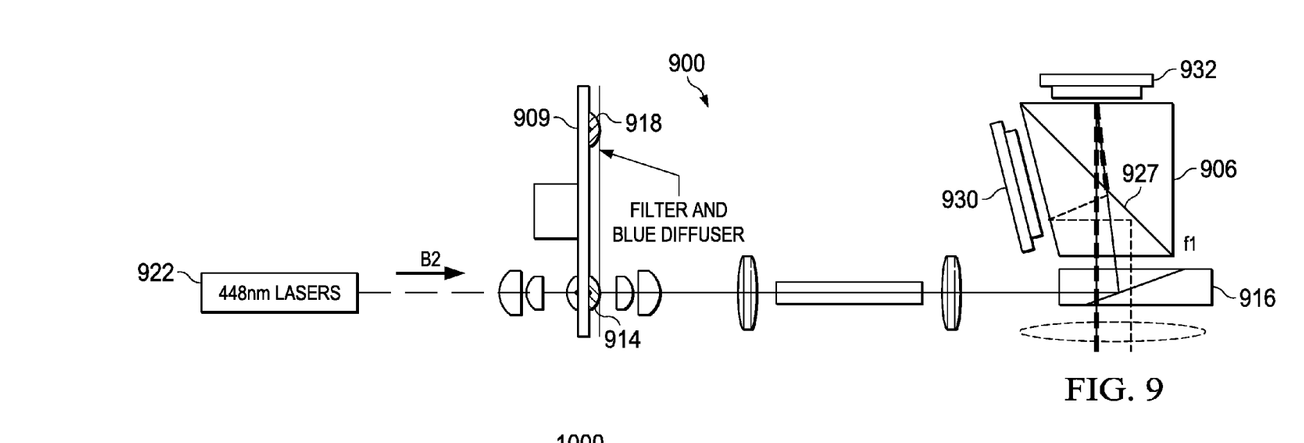

FIG. 9 illustrates a modification 900 of the arrangement 800 of FIG. 8 wherein a single filter is used to separate and combine colors. Here, the red, green and blue colors are passed along a same path from the phosphor wheel 909 to the optics input to the DMDs 930, 932. A single TIR structure 916 directs the light at suitable angles into the color separating prism structure 906, with the red light directed to a first DMD 930 at one exit face by reflection off a centrally positioned angled dichroic filter 927 (fl) and the green and blue light directed to a second DMD 932 at another exit face by transmission through the same dichroic filter 927. The modulated beams are then returned along similar reflection and transmission paths and directed through the same TIR structure 916 to the projection lens for display of the composite color image. As discussed previously, red and green light may be generated by green and yellow phosphors 914, 918 having emission spectra like those shown in FIGS. 5A and 5B. The same principles can be adapted to reflective phosphor wheel arrangements, such as described above.

Figure 10:
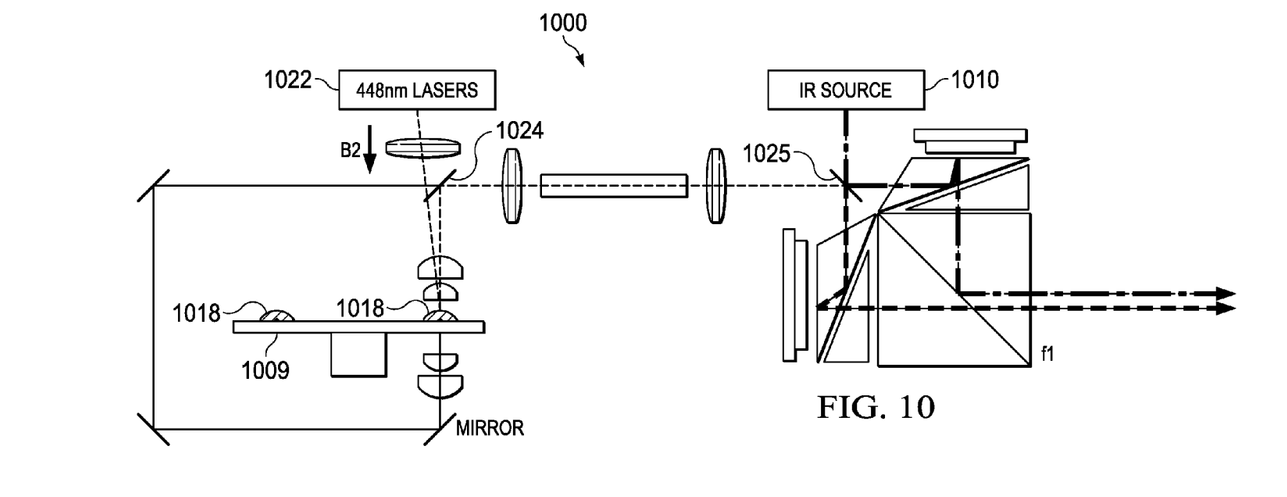
Figure 11:
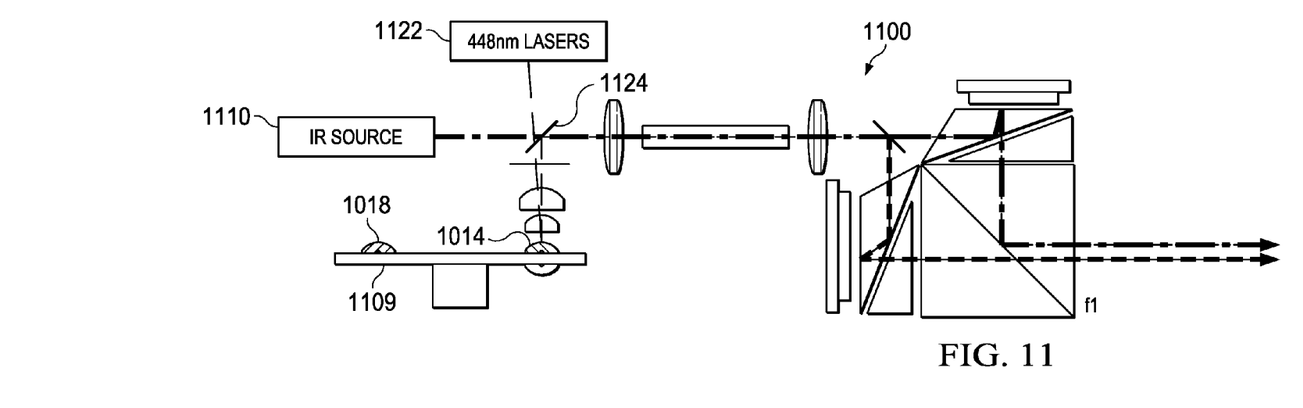
Figure 12:
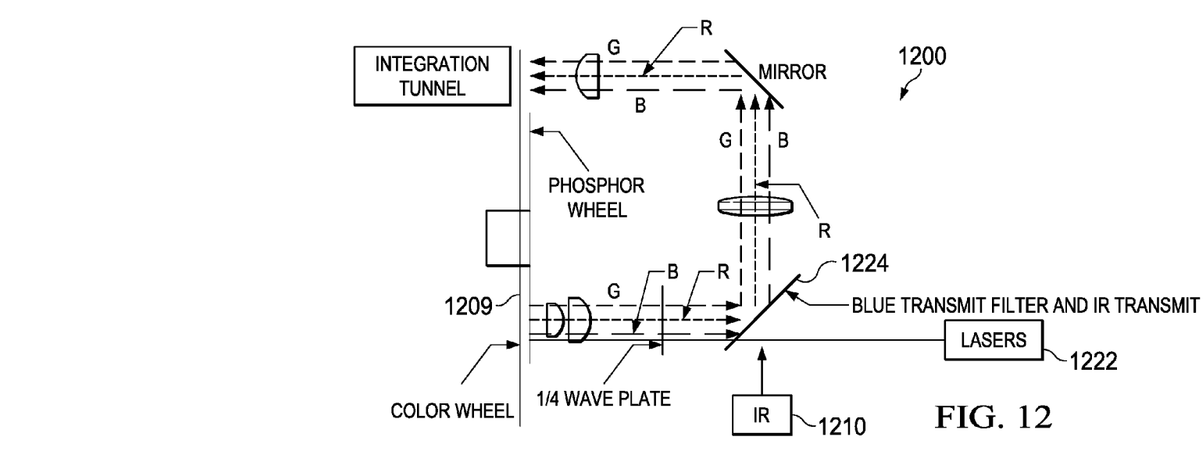

FIGS. 10 through 12 illustrate example arrangements 1000, 1100, 1200 in which an infrared (IR) light source is introduced into the projection system. In FIG. 10, the IR light is shown introduced by a laser light source 1010 following at least a portion of the relay optics for modulation in a common and/or time sequenced manner with one or more of the other colors. In FIGS. 11 and 12, the IR light is shown introduced by an IR laser light source 1110, 1210 in a direction of the phosphor wheel generated light path at a blue input laser light transmitting filter 1124, 1224 positioned between a 448 nm blue laser light source 1122, 1222 and the phosphor wheel 1109, 1209. The introduced IR light may, for example, serve a pattern generation function, such as for feedback control (focusing, shaping, etc.) of the projector, or provide an illumination blanket to an imaging surface, such as for touch detection on the surface of a backside illuminated touch screen. The same principles may be applied for the introduction of other light, such as in the ultraviolet (UV) or other non-visible region of the electromagnetic spectrum.

There is no requirement that the modulation or projection be limited to red, green and blue primary colors, and the same principles will readily apply to other choices of principal or secondary colors.

A typical implementation of the two-chip architecture utilizes a single bank of lasers to produce the red, green and blue light. The objective is to create the phosphor light output and then divide this light into red and green components. During the blue time, the blue light is passed through to the first DMD and the second DMD is idle during this time. The efficiency is doubled since there is only one bank of lasers used to generate all of the light. One suitable architecture 1300 is shown FIG. 13, which is similar to the arrangement 700 already described with reference to FIG. 7.

Figure 13:
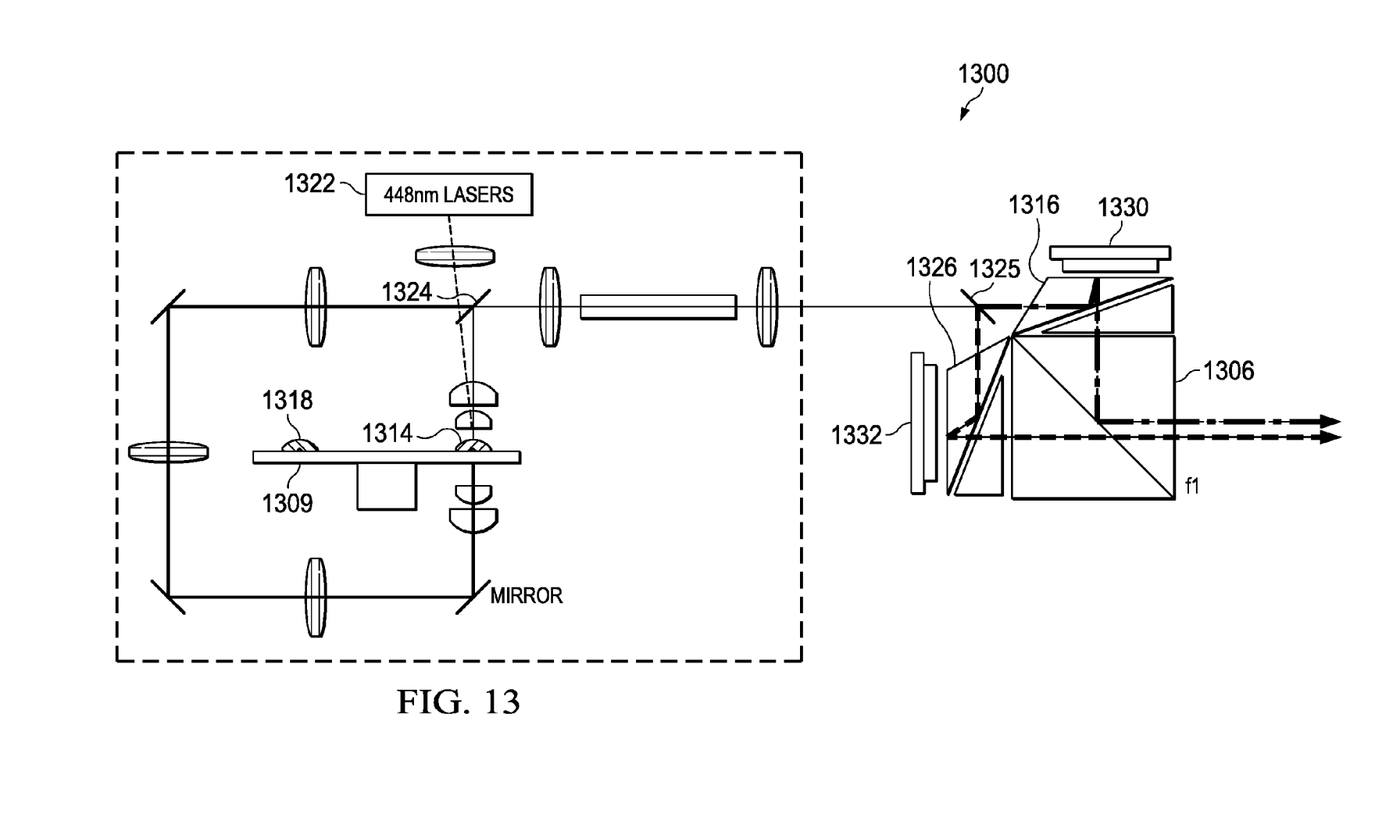

In this system design, a single laser bank 1322 is used. The light generated is passed to the first filter 1324. Here the red light is split off and sent to the first DMD 1330 and the green light is sent to the second DMD 1332. When the blue is present, it is sent to the second DMD 1332. (Note: it could also be sent to the first DMD 1330 as well. This is just a filter change). The two light paths are then individually modulated by the respective DMDs 1330, 1332. The "ON"-state light is then recombined by the color cube 1306. In the arrangement 1300 shown in FIG. 12, the red is reflected, but could also be transmitted as well with a filter change. A similar statement can be made for the green/ blue channel.

A second type of architecture may be created by merely switching out the illumination module (dot-dashed lines in FIG. 13) prior to the filter 1325. The illumination module may, for example, be changed to use a transmissive phosphor wheel. This will result in an arrangement such as previously described with reference to FIG. 8.

Either single phosphors or two phosphors may be used (along with blue reflection or transmission segments) on the wheel, with spectra from a yellow and green phosphor being split into their two components of green and red. A system utilizing a single yellow phosphor, for example, may produce a good white point and enable a good red to be selected using a prism, but the green may suffer, giving a color point just inside the ITU-R Recommendation BT.709 green color point. If a single green phosphor is used, the green point may be good (outside Rec. 709), but the white point may be poor (very cyan white point). An approach that uses both green and yellow phosphors will produce two greens and two reds, but identical sequences can be created for both colors giving the ability to blend the two greens to a single green and to blend the two reds for a single red.

For typical illumination architectures, the output light from the phosphor which is sent to the green DMD will advantageously have a blue reject filter in the path, but must pass blue light during the blue time. For an architecture with the blue bypass like that shown in FIG. 13, the filter 1324 rejects the blue light for the green and yellow phosphor. For a transmissive phosphor system, a filter can be added at the output of the phosphor wheel for the phosphor sections and just a diffuser for the blue section.

Modifications are possible in the described embodiments, and other embodiments are possible, within the scope of the claims.

What is claimed is:

1. A method for projecting images, the method comprising:
   generating blue light from at least one blue light source;
   generating at least red and green light from phosphor excited by at least some of the blue light;
   introducing at least the red light to a first spatial light modulator via a first TIR or RTIR element;
   introducing at least the green light to a second spatial light modulator via a second TIR or RTIR element;
   introducing at least some of the blue light to at least one of: the first spatial light modulator via the first TIR or RTIR element; and the second spatial light modulator via the second TIR or RTIR element;
   modulating the introduced red light by the first spatial light modulator;
   modulating the introduced green light by the second spatial light modulator;
   to an extent the blue light is so introduced to the first spatial light modulator, modulating the introduced blue light by the first spatial light modulator, time-sequentially apart from the first spatial light modulator's modulation of the introduced red light;
   to an extent the blue light is so introduced to the second spatial light modulator, modulating the introduced blue light by the second spatial light modulator, time-sequentially apart from the second spatial light modulator's modulation of the introduced green light;
   passing the modulated red light into a color combining prism structure via the first TIR or RTIR element;
   passing the modulated green light into the color combining prism structure via the second TIR or RTIR element;
   to an extent the blue light is so modulated by the first spatial light modulator, passing the modulated blue light into the color combining prism structure via the first TIR or RTIR element, time-sequentially apart from the first TIR or RTIR element's passing of the modulated red light;
   to an extent the blue light is so modulated by the second spatial light modulator, passing the modulated blue light into the color combining prism structure via the second TIR or RTIR element, time-sequentially apart from the second TIR or RTIR element's passing of the modulated green light; and
   with the color combining prism structure, combining the modulated red, green and blue light into a combined modulated RGB light stream.

2. The method of claim 1, wherein the phosphor includes at least a yellow light emitting phosphor to generate at least the red and green light when excited by at least some of the blue light.

3. The method of claim 1, further comprising:
   filtering to separate the red and green light generated from the phosphor.

4. The method of claim 1, wherein the phosphor is disposed on a phosphor wheel.

5. The method of claim 1, wherein the at least one blue light source includes a blue laser light source.

6. The method of claim 1, further comprising: via projection optics, projecting the combined modulated RGB light stream onto a target imaging surface to form an image.

7. The method of claim 1, wherein: the at least one blue light source includes at least first and second blue light sources having respective first and second wavelengths; the introduced blue light has the first wavelength; and the phosphor is excited by at least some of the blue light having the second wavelength.

8. The method of claim 1, wherein the first and second spatial light modulators are digital micromirror devices (DMDs).

9. The method of claim 1, wherein the phosphor includes at least first and second phosphor coatings, the red light is generated from the first phosphor coating excited by at least some of the blue light, and the green light is generated from the second phosphor coating excited by at least some of the blue light.

10. Apparatus for projecting images, the apparatus comprising:
    at least one blue light source to generate blue light;
    phosphor arranged to generate at least red and green light when excited by at least some of the blue light;
    a first spatial light modulator to modulate at least the red light;
    a second spatial light modulator to modulate at least the green light;
    a first TIR or RTIR element arranged to introduce at least the red light to the first spatial light modulator for modulation thereof;
    a second TIR or RTIR element arranged to introduce at least the green light to the second spatial light modulator for modulation thereof; and
    a color combining prism structure;
    wherein at least one of the first and second TIR or RTIR elements is arranged to introduce at least some of the blue light to at least one of the first and second spatial light modulators, respectively, for modulation thereof: time-sequentially apart from the first spatial light modulator's modulation of the introduced red light, to an extent the blue light is so introduced to the first spatial light modulator; and time-sequentially apart from the second spatial light modulator's modulation of the introduced green light, to an extent the blue light is so introduced to the second spatial light modulator;
    wherein the first TIR or RTIR element is arranged to: pass the modulated red light into the color combining prism structure; and, to an extent the blue light is so modulated by the first spatial light modulator, pass the modulated blue light into the color combining prism structure, time-sequentially apart from the first TIR or RTIR element's passing of the modulated red light;

wherein the second TIR or RTIR element is arranged to: pass the modulated green light into the color combining prism structure; and, to an extent the blue light is so modulated by the second spatial light modulator, pass the modulated blue light into the color combining prism structure, time-sequentially apart from the second TIR or RTIR element's passing of the modulated green light; and wherein the color combining prism structure is arranged to combine the modulated red, green and blue light into a combined modulated RGB light stream.

11. The apparatus of claim 10, wherein the phosphor includes at least a yellow light emitting phosphor to generate at least the red and green light when excited by at least some of the blue light.

12. The apparatus of claim 10, further comprising a filter to separate the red and green light generated from the phosphor.

13. The apparatus of claim 10, wherein the phosphor is disposed on a phosphor wheel.

14. The apparatus of claim 10, wherein the at least one blue light source includes a blue laser light source.

15. The apparatus of claim 10, further comprising projection optics arranged to project the combined modulated RGB light stream onto a target imaging surface to form an image.

16. The apparatus of claim 10, wherein: the at least one blue light source includes at least first and second blue light sources having respective first and second wavelengths; the introduced blue light has the first wavelength; and the phosphor is excited by at least some of the blue light having the second wavelength.

17. The apparatus of claim 10, wherein the first and second spatial light modulators are digital micromirror devices (DMDs).

18. The apparatus of claim 10, wherein the phosphor includes at least first and second phosphor coatings, the red light is generated from the first phosphor coating excited by at least some of the blue light, and the green light is generated from the second phosphor coating excited by at least some of the blue light.

* * * * *